Oct. 30, 1923.
H. H. MANNING
CUTTER HEAD ATTACHMENT
Filed Sept. 15, 1919
1,472,565
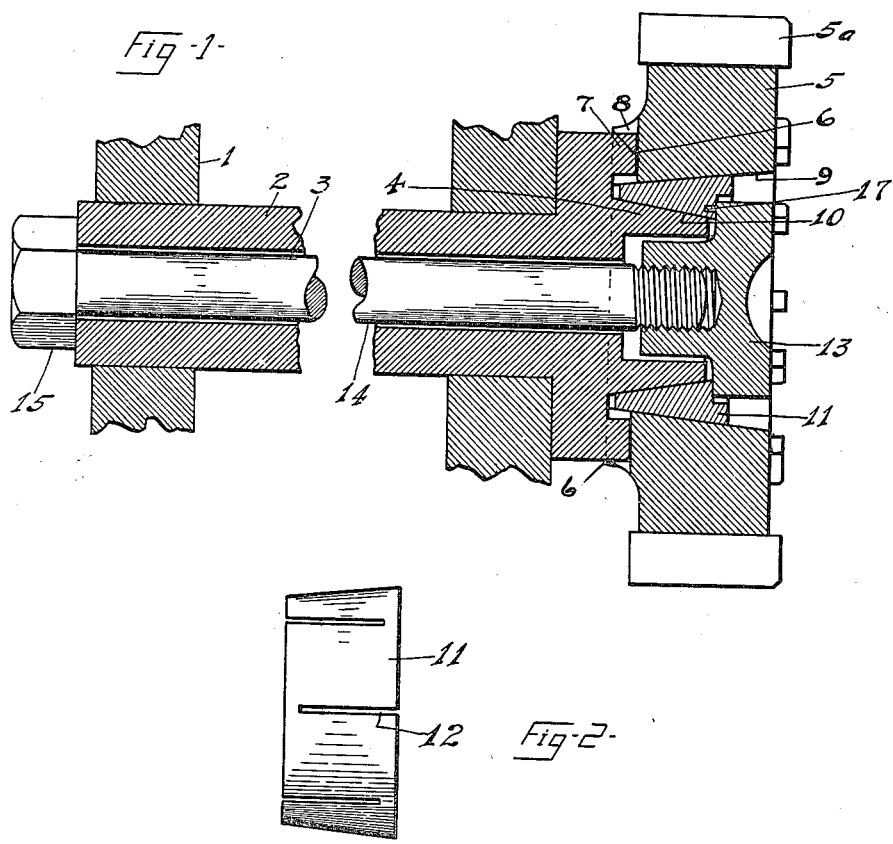
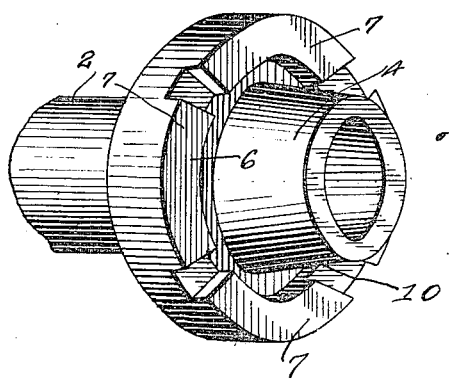
INVENTOR
Howard H. Manning

Patented Oct. 30, 1923.

1,472,565

UNITED STATES PATENT OFFICE.

HOWARD H. MANNING, OF MEADVILLE, PENNSYLVANIA.

CUTTER-HEAD ATTACHMENT.

Application filed September 15, 1919. Serial No. 323,831.

*To all whom it may concern:*

Be it known that I, HOWARD H. MANNING, a citizen of the United States, residing at Meadville, in the county of Crawford and State of Pennsylvania, have invented new and useful Improvements in Cutter-Head Attachments, of which the following is a specification.

The purpose of the invention is to rigidly secure a milling cutter head to its spindle and at the same time permit of a convenient removal of the head from the spindle. It will be understood that not only must the cutter head be securely locked with the spindle against turning but also must be accurately centered with relation to the spindle.

The invention is illustrated in the accompanying drawings as follows:—

Fig. 1 shows a section of a portion of a spindle with a cutter head thereon.

Fig. 2 a side elevation of a collapsing collar used in the attachment.

Fig. 3 a perspective view of the head carrying spindle.

1 marks the spindle bearing which may be of any form, 2 the spindle, 3 an opening extending through the spindle, and 4 a shouldered extension on the spindle.

The cutter head 5 is provided with the usual cutters 5ª and is mounted on the shouldered extension against the shoulder 6. The shoulder is provided with the keys 7 which enter the grooves 8 on the head, thus locking the cutter against rotative movement relatively to the spindle.

The head has a tapered opening 9 and the extension 4 is oppositely tapered at 10. The head is mounted on this extension and a collapsing collar 11 is arranged between the tapered walls of the opening 9 and the tapered surface 10. A nut 13 operates against the collapsing collar and a bolt 14 extends into the nut and through the spindle, being provided with a head 15 at the rear end of the spindle.

It will readily be observed that by screwing up the bolt 14 the collapsing collar 11 forces the head 5 against the shoulder 6 and at the same time accurately centers the head and clamps it with relation to the extension 4 so that the concentric mounting of the cutter head on the spindle is assured.

The collapsing collar is preferably formed as shown in Fig. 2 with the slots 12 extending inwardly alternately from opposite ends of the collar, the slots overlapping. With this arrangement there is an adjustment of the collar to the tapered surfaces of the opening 9 and on the extension 4 so that the collar fills the space while maintaining the parts in concentric relation.

The nut 13 is preferably locked against movement by a projection 17 extending into the collar 11.

It will be noted that this mounting gives a locking means, as through the keys 7, at a point quite remote from the axis so that the driving thrust on the key-way is reduced and the mounting against the shoulder assures a true position of the head in a plane at right angles to the axis of the spindle and also permits of a mounting of the head adjacent to its bearing.

By making the extension on the spindle tapered the collar and head may be readily detached from the spindle.

What I claim as new is:—

1. In a cutter head attachment, the combination of a spindle having a shouldered extension thereon; a cutter head having an opening into which the spindle projects with the head mounted against the shoulder, the periphery of the opening in the head and the periphery of the spindle being out of contact and formed with opposing tapered surfaces; a tapered collapsing collar between the spindle and head; and means for forcing the collar axially to engage the spindle and head and to force the head against the shoulder.

2. In a cutter head attachment, the combination of a spindle having a shouldered extension thereon; a cutter head having an opening into which the spindle projects with the head mounted against the shoulder; a tapered collapsing collar between the spindle and head; means for forcing the collar axially to engage the spindle and head and to force the head against the shoulder; and means for interlocking the head with the shoulder.

3. In a cutter head attachment, the combination of a spindle having a shouldered extension thereon; a cutter head having a tapered opening therethrough into which the spindle projects, the head being mounted against the shoulder; a tapered collapsing collar between the spindle and head operating on the tapered opening in the head; means for forcing the tapered collar axially to force it into engagement with the head and spindle and to force the head against the shoulder; and means for interlocking the head with the shoulder.

4. In a cutter head attachment, the combination of a spindle having a tapered shouldered extension; a cutter head having a tapered opening into which the extension projects, the head being mounted against the shoulder; a collapsing collar having double tapered surfaces engaging the surface of the opening and the extension; means for forcing the collar axially; and means for interlocking the head with the shoulder.

5. In a cutter head attachment, the combination of a spindle having a tapered shouldered extension; a head having a tapered opening therein mounted on the extension and against the shoulder; a collapsing collar having tapered surfaces engaging the tapered surfaces forming the walls of the opening and the extension; a nut operating against the collar; a bolt extending through the spindle and operating on the nut; means for locking the nut with the collar; and means for interlocking the head with the shoulder.

In testimony whereof I have hereunto set my hand.

HOWARD H. MANNING.